(12) United States Patent
Tan et al.

(10) Patent No.: US 8,315,526 B2
(45) Date of Patent: Nov. 20, 2012

(54) MISALIGNMENT TOLERANT FREE SPACE OPTICAL TRANSCEIVER

(75) Inventors: Michael R. T. Tan, Palo Alto, CA (US); David A. Fattal, Palo Alto, CA (US); Terrel Morris, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1155 days.

(21) Appl. No.: 11/820,299

(22) Filed: Jun. 18, 2007

(65) Prior Publication Data
US 2008/0310852 A1  Dec. 18, 2008

(51) Int. Cl.
*H04B 10/00* (2006.01)

(52) U.S. Cl. ......... 398/118; 398/122; 398/129; 398/131

(58) Field of Classification Search ................... 398/156, 398/122, 129, 131, 118, 119, 123, 128, 130, 398/136, 138, 139, 158, 82, 88, 96, 101, 398/127, 135, 140, 151, 153, 87
See application file for complete search history.

(56) References Cited

U.S. PATENT DOCUMENTS

| | | | | |
|---|---|---|---|---|
| 4,025,197 | A * | 5/1977 | Thompson | 356/499 |
| 4,049,969 | A * | 9/1977 | Salonimer et al. | 250/458.1 |
| 4,941,721 | A * | 7/1990 | Banton et al. | 359/217.1 |
| 5,515,462 | A | 5/1996 | Huang et al. | |
| 5,790,291 | A * | 8/1998 | Britz | 398/129 |
| 6,172,779 | B1 * | 1/2001 | Takahashi et al. | 359/16 |
| 6,317,536 | B1 * | 11/2001 | Bhagavatula et al. | 385/24 |
| 6,775,480 | B1 * | 8/2004 | Goodwill | 398/158 |
| 6,956,992 | B2 * | 10/2005 | Coleman | 385/33 |
| 7,016,566 | B2 | 3/2006 | Dimas et al. | |
| 7,035,549 | B2 * | 4/2006 | Davies et al. | 398/164 |
| 2002/0067549 | A1 * | 6/2002 | Tawa et al. | 359/642 |
| 2004/0101238 | A1 * | 5/2004 | Coleman | 385/33 |
| 2004/0105096 | A1 * | 6/2004 | Takami | 356/369 |
| 2004/0141753 | A1 * | 7/2004 | Andreu-von Euw et al. | 398/122 |
| 2005/0031262 | A1 | 2/2005 | Hisatomi et al. | |
| 2009/0103925 | A1 * | 4/2009 | Alpert | 398/130 |

FOREIGN PATENT DOCUMENTS

| | | |
|---|---|---|
| JP | 2-41042 | 2/1990 |
| JP | 5-40214 | 2/1993 |
| JP | 5-347592 | 12/1993 |

(Continued)

OTHER PUBLICATIONS

Song, Seok Ho et al., "Focusing-grating-coupler arrays for uniform and efficient signal distribution in a backboard optical interconnect", App. Optics, 34:26:5913-5919 (1995).

(Continued)

*Primary Examiner* — M. R. Sedighian

(57) ABSTRACT

In accordance with an aspect of the invention, a system has a transmitter and a receiver, where the transmitter includes a beam source and an optical element. The beam source produces a beam that represents information, and the optical element alters the beam so that the beam has a uniform intensity over a cross-sectional area. The receiver is separated from the transmitter by free space through which the beam propagates and includes an active area positioned to receive a portion of the beam that the receiver converts into a received signal. To accommodate possible misalignment, the cross-sectional area of the beam is larger than the active area by an amount that accommodates a range of misalignment of the receiver with the transmitter.

24 Claims, 2 Drawing Sheets

FOREIGN PATENT DOCUMENTS

| | | |
|---|---|---|
| JP | 06-011666 | 1/1994 |
| JP | 7-99480 | 4/1995 |
| JP | 7-303085 | 11/1995 |
| JP | 9-44272 | 2/1997 |
| JP | 2004-70339 | 3/2004 |
| JP | 2007-68157 | 3/2007 |
| WO | WO-2007036937 A2 | 4/2007 |

OTHER PUBLICATIONS

Yu, Zongfu et al., "Design of midinfrared photodetectors enhanced by surface plasmons on grating structures", Applied Physics Letters 89:151116-1- to 151116-3 (2006).

"Strategies for Beam Homogenizing" SUSS MicroOptics SA, www.suss-microoptics.com/beamhomogenizer.html pp. 1-5 (2006).

\* cited by examiner

MISALIGNMENT TOLERANT FREE SPACE OPTICAL TRANSCEIVER

BACKGROUND

High data rate signal transmission is a concern in many systems. Current server systems, for example, often use a set of rack mounted components or user-selected blades that work together to provide data storage, processing, and communications, and the individual components often need to communicate with each other at high data rates to provide the desired system performance. In a server system using blades, the blades, e.g., server blades and storage blades, are mounted in a common enclosure and share components such as cooling fans, power supplies, and enclosure management. In general, data signals transmitted among the blades must collectively provide high data rate transmissions, and with current technology, each data signal may have a bandwidth of about 10 Gbit/s or more.

Electrical signals generally oscillate at high frequencies to provide high data transmission rates, and the high frequency oscillations can present impedance and noise problems for electrical signals transmitted over copper wires. Optical signaling can avoid many of these problems, but optical signaling may still require complex waveguide systems or dealing with loose optical cables or ribbons. Optical signaling also requires circuits for conversion between optical and electrical signals, and the requirements for such circuits may present challenges. For example, a receiver converting a high data rate optical signal to an electrical signal for an electronic component generally requires a small-area photodiode because of the high frequency of the electrical signal, and directing the optical signal onto the small area of the photodiode generally requires use of precise and reliable alignment systems. Other methods and systems for transmitting high data rate signals that avoid the problems associated with wires and optical fibers or waveguides are sought.

SUMMARY

In accordance with an aspect of the invention, a system has a transmitter and a receiver, where the transmitter includes a beam source and an optical element. The beam source produces a light beam that represents information, and the optical element alters the beam so that the beam has a uniform intensity over a cross-sectional area. The receiver is separated from the transmitter by free space through which the beam propagates and includes an active area positioned to receive a portion of the beam that the receiver converts into a received signal. To accommodate possible misalignment, the cross-sectional area of the light beam is larger than the active area of the receiver by an amount that accommodates a range of misalignment of the receiver with the transmitter.

BRIEF DESCRIPTION OF THE DRAWINGS

Use of the same reference symbols in different figures indicates similar or identical items.

DETAILED DESCRIPTION

In accordance with an aspect of the invention, an optical transmitter for a high data rate signal can use an optical element such as a diffuser to spread the intensity of a free space beam uniformly over an area sufficient to compensate for expected misalignment between the transmitter and a target receiver. The area of the optical beam will typically be large relative to the size of a photodiode in a receiver. As a result, the photodiode will receive uniform power even if the transmitter and receiver are misaligned or move relative to each other because of mechanical vibrations or translations caused by thermal expansion or contractions. In one particular embodiment, separate components such as circuit boards or blades in a server that are mounted roughly parallel to each other can communicate at high data rates using free space optical signals.

Figure 1:
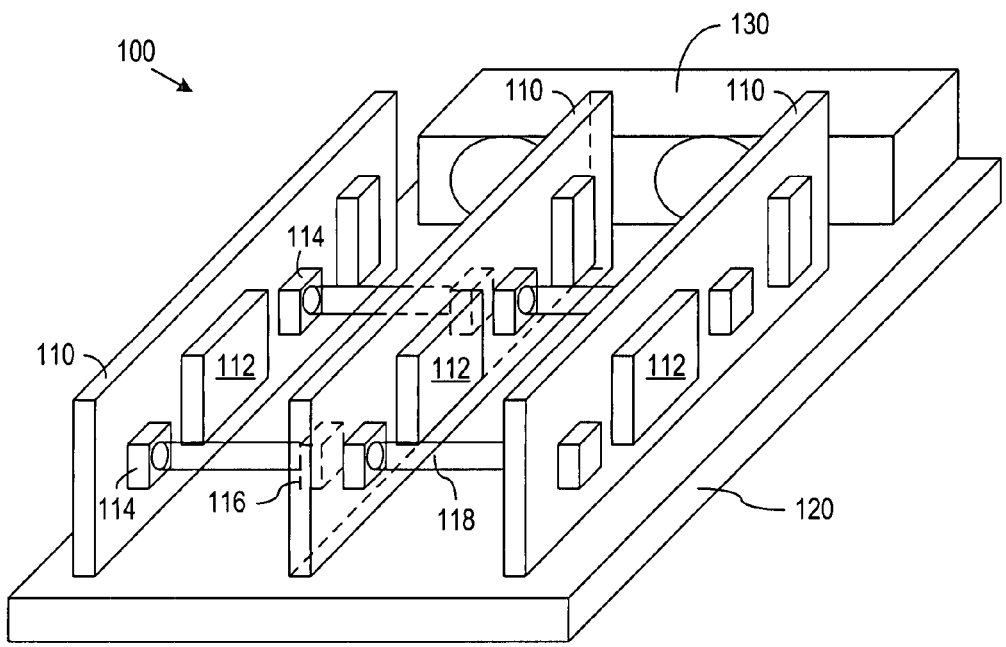
FIG. 1 shows a server system in accordance with an embodiment of the invention employing alignment-tolerant free space data channels for communications among system planes or blades.

FIG. 1 illustrates a server system 100 in accordance with an embodiment of the invention. System 100 includes a set of blades 110 that are mounted on a shared backplane 120. Additional components 130 such as power supply transformers and cooling fans can also be connected to backplane 120, and the entire assembly would typically be contained in a shared enclosure (not shown). A user interface and sockets for external connections to server system 100 may be provided through the shared enclosure.

Some or all of blades 110 in system 100 may be substantially identical or of differing designs to perform different functions. For example, some blades 110 may be server blades or storage blades. Each blade 110 includes one or more subsystems 112 that implement the particular functions of the blade 110. Subsystems 112 may be mounted on either one or both sides of each blade 110 in the manner of components on a printed circuit board, or blades 110 may include enclosures with subsystems 112 in the interior of the blade 110. Typical examples of such subsystems 112 include hard drives or other data storage and processor subsystems containing conventional computer components such as microprocessors, memory sockets, and integrated circuit memory. Subsystems 112 and the general features of blades 110 may be of conventional types known for server systems using blade architectures, such as the c-class architecture of sever systems commercially available from Hewlett-Packard Company.

Each blade 110 additionally includes one or more optical transceivers 114 or 116. Each transceiver 114 is positioned on a blade 110 to be nominally aligned with a corresponding transceiver 116 on a neighboring blade 110 when the blades 110 are properly mounted on backplane 120. Transceivers 114 and 116 may otherwise be substantially identical to each other. In a typical configuration for server system 100, there may be about 5 cm of free space between corresponding transceivers 114 and 116, and each aligned pair of transceivers 114 and 116 may be subject to misalignment on the order of about 500 to 1000 µm due to variations in the mechanical mounting of blades 110. Additionally, the alignment of transceivers 114 and 116 may be subject to variations on the order of 40 to 50 µm due to temperature variations and/or mechanical vibrations, for example, from the operation of cooling fans.

The receiver section of each transceiver 114 or 116 generally includes a photodiode having a light sensitive area of a size selected according to the data rate of the transmitted signal. For a data rate of 10 Gb/s or larger the width of light sensitive area generally needs to be less than about 40 μm across. An optical communication channel between a pair of transceivers 114 and 116 is made tolerant of the misalignment through use of a beam 118 having a uniform intensity over an area that is sufficient to provide a consistent power to the photodiode regardless of the misalignment. As an example, if the power at the transmitter is around 1 mW and the receiver sensitivity is around 10 μW, the transmitted beam can be expanded to 1 $mm^2$, and the receiver only needs to capture 0.1 $mm^2$ of the transmitted beam to receive 10 μW of power. Typically, a 10-Gbps photodetector has a receiving aperture of around 40 microns, but a small optical element, such as a lens, on the receiving side can collect and focus the received power from a 0.1-$mm^2$ area into the active area of the photodetector in the receiver. In this example, expansion of the light beam relaxes the required alignment accuracy of transceivers 114 and 116 from a few microns (since the beam must be focused down to a small spot on the photodetector to avoid slow tails) up to a few hundred microns.

Figure 2:
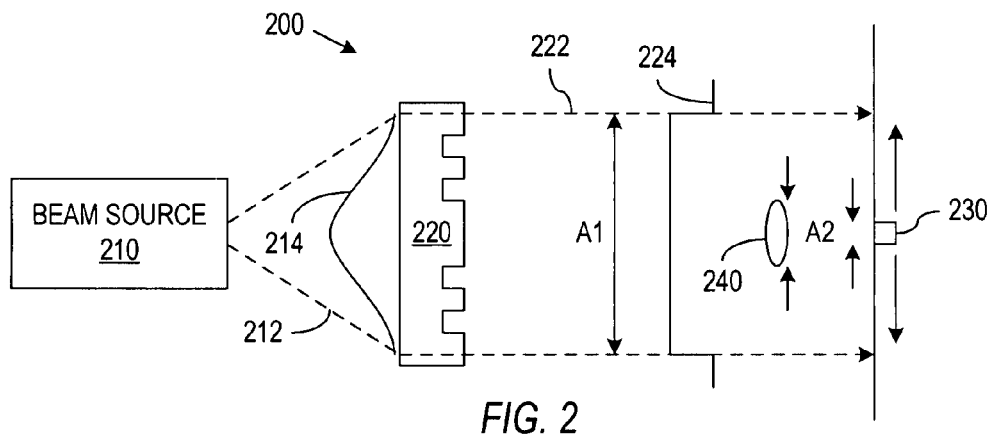
FIG. 2 shows a free space data channel according to an embodiment of the invention employing an optical element to produce a beam with a spatially uniform intensity over a width required for alignment tolerant transmissions.

FIG. 2 illustrates a system 200 implementing a misalignment tolerant optical communication channel in accordance with an embodiment of the invention. System 200 includes a beam source 210 and an optical element 220 that may be in an optical transmitter or the transmission part of an optical transceiver such as transceiver 114 or 116 of FIG. 1. System 200 also includes a photodiode 230 that may be in an optical receiver or the receiver part of an optical transceiver such as transceiver 116 or 114 of FIG. 1.

Beam source 210 produces a beam 212 that that is modulated in to encode data for transmission. In an exemplary embodiment, beam source 210 includes a laser diode such as a VCSEL and a drive circuit that varies the drive power to the laser diode as needed to produce an amplitude modulation of beam 212. Alternatively, an acousto-optic modulator or other device can be positioned to encode data in a constant power beam from a laser diode. Beam 212 generally has a non-uniform intensity distribution, which is characteristic to beam source 210. For example, a typical beam 212 from a laser diode may have an energy or intensity distribution 214 with an approximately Gaussian dependence on radial distance from the center of beam 212. Additionally, a typical numerical aperture of a beam from a VCSEL is around 0.3.

Optical element 220 operates as a diffuser to collimate and spread the energy in a beam 222 evenly over an area having a width A1. Diffractive optical elements that operate as engineered diffusers suitable for producing a uniform intensity distribution 224 for beam 222 are commercially available through sources such as Thorlabs, Inc, and Suss MicrOptics. However, optical element 220 could alternatively include refractive optics that similarly generate a flat top intensity distribution. For example Dickey et. al. "Beam Shaping: A Review," in Laser Beam Shaping Applications, Dickey, Holswade and Shealy, CRC p. 269-307, describe systems using microoptical lens arrays to convert an input laser beam into multiple beamlets while a second lens array in combination with a spherical lens superimposes the images of each of the beamlets in the first array into the homogenization plane. The cross-sectional area of uniform intensity produced by optical element 220 can be of any desired shape, e.g., circular, rectangular, or square, but is preferably chosen to cover an expected range of misalignment and/or movement of photodiode 230 relative to beam source 210. With such a configuration, the photoactive area of photodiode 230 will remain in an area of uniform beam intensity and receive a constant beam power, even when photodiode moves as a result of vibrations.

System 200 when applied in a server system such as illustrated in FIG. 1 can transmit data at about 10 Gbit/s. At such frequencies, photodiode 230 preferably has a small photoactive area, e.g., with a width A2 on the order of about 40 to 50 μm. Beam 222 should have a width of about 100 μm for the expected maximum misalignment of about 40 to 50 μm resulting from mechanical vibrations, thermal variations, and fixed alignment error expected in a conventional blade server system. In this configuration, photodiode 230 receives about 25% of the optical power in beam 222. Thus with a 1 mW intensity laser, the receiver receives about 250 μW of power at the photodetector even with a 50 μm misalignment. Expanding the beam to about a width of about 1 mm, for greater misalignment tolerance, will yield a received power of 2.5 μW at the 50-μm detector, but adding a lens 240 at the receiver allows capture of more power while still providing substantial misalignment tolerance. In general, the amount of received power required to detect the transmitted data can be traded off with misalignment tolerance.

Figure 3:
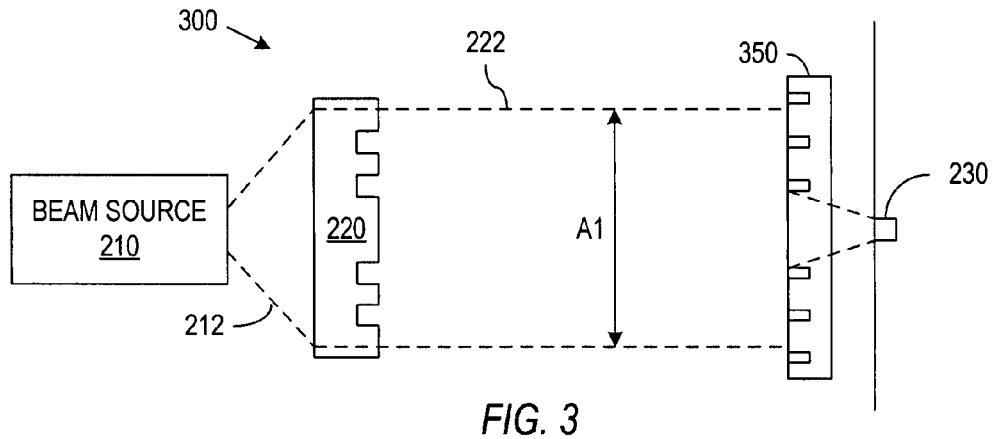
FIG. 3 shows a free space data channel according to an embodiment of the invention employing a photodiode and a grating system to enhance collected optical signal strength.

FIG. 3 illustrates a system 300 using a beam source 210 and an optical element 220 as in system 200 of FIG. 2 to produce a beam 222 having a uniform intensity distribution across a cross-section of beam 222, but system 300 further uses a grating structure 350 to enhance collection of light from beam 222 into photodiode 230. Such grating structures are known and further described, for example, by Yu et al., "Design of Midinfrared Photodetectors Enhanced by Surface Plasmon on Grating Structures," Appl. Phys. Lett. 89. 115116 (2006). Grating structure 350 concentrates beam 222 on photodiode 230 to provide a stronger signal and reduce the power wasted from beam 222.

A free space communication channel similar to that illustrated in FIG. 3 can alternatively use grating structure 350 to collect signal energy from a non-uniform signal beam. The optical channel would still be tolerant of misalignment provided that area of grating structure 350 is sufficient that the portion of the signal beam incident on grating structure 350 for the range of expected misalignments of photodiode 230 and beam source 210 is sufficient to detect the transmitted data.

Figure 4:
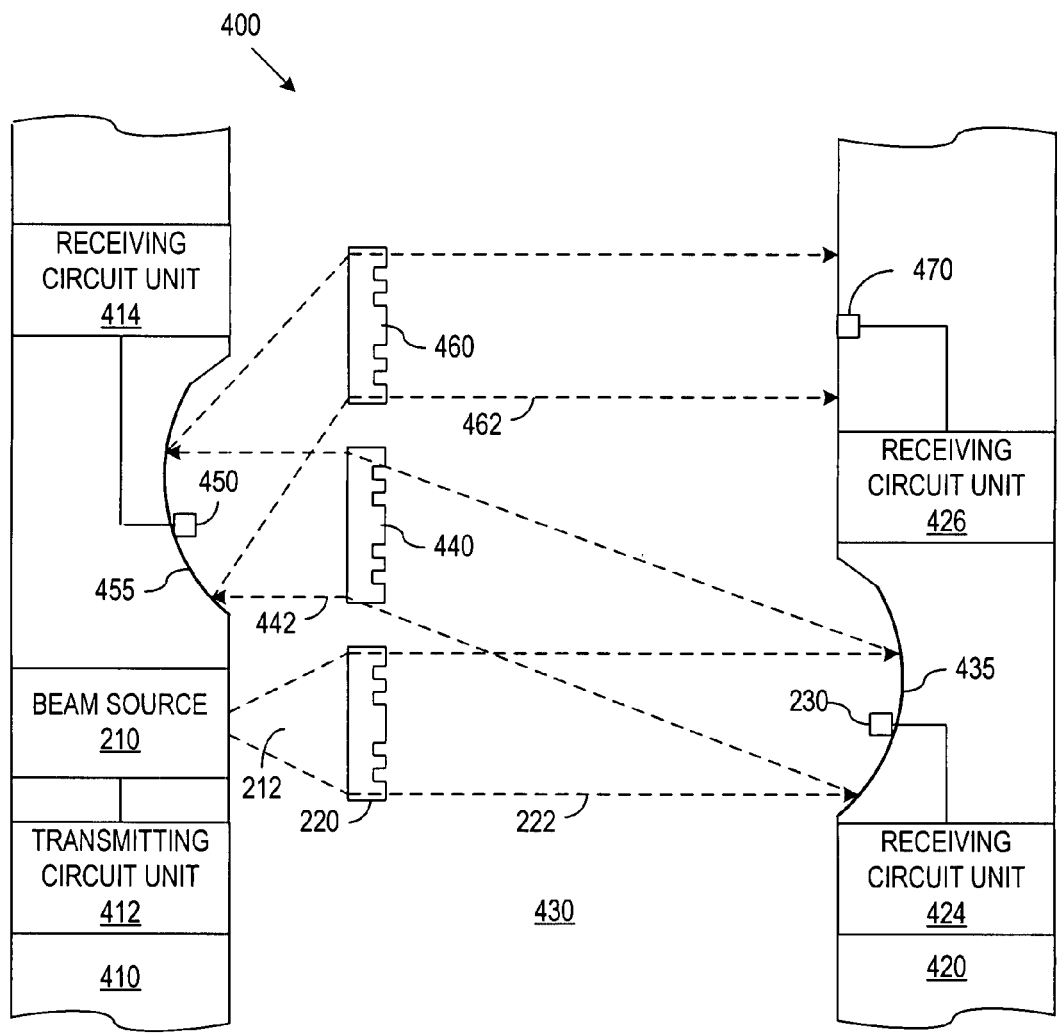
FIG. 4 is a cross-sectional view of a system in accordance with an embodiment of the invention using reflectors for fan out of an alignment tolerant optical signal.

FIG. 4 illustrates a system 400 in accordance with an embodiment of the invention using a free space optical signal to distribute communications from a transmitting circuit unit 412 in a first system plane 410 to circuit units 414 in the same system plane 410 or circuit units 424 and 426 in another system plane 420. System planes 410 and 420 may be circuit boards, blades in a server system such as illustrated in FIG. 1, or similar systems having components with electrical circuit units 412, 414, 424, and 426 that may require high data-rate communications. System planes 410 and 420 can be mounted on a shared base or back plane 430 so that system planes 410 and 420 are substantially parallel to each other and substantially perpendicular to back plane 430.

In operation, transmitting circuit unit 412 in system plane 410 controls a beam source 210 to encode desired data in a light beam 212 that beam source 210 transmits through a diffractive element 220. The diffractive element 220 distributes beam energy to produce a uniform intensity beam 222 that is transmitted through free space to system plane 420. Beam 222 has a uniform intensity across an area such that a photodiode 230 on system plane 420 receives uniform power for any position of photodiode 230 with a range of expected misalignment of beam source 210 and photodiode 230. Photodiode 230 can thus receive and convert a portion of beam 222 into an electrical signal provided to circuit unit 424 in system plane 420, and the magnitude of the electrical signal is not subject to unacceptable variations due to alignment errors or mechanical vibrations. The mechanical vibrations are at extremely low frequencies, typically less than 1 kHz while the transmitted data is on the order of a few hundred megahertz to several or tens of gigahertz, thus the movement of the beam due to vibrations will not degrade the received data so long as the portion of the transmitted beam does not deviate outside the photodiode area. If the expected trajectory of the mechanical vibrations from the transmitting board is known, the receiving aperture, which includes either a grating or lens, can be patterned to match the trajectory of the transmitted beam, thus improving the alignment tolerance.

A reflector 435 around photodiode 230 is designed and positioned to reflect a portion of beam 222 back through free space toward system plane 410. When photodiode 230 is small relative to the area of beam 222, reflector 435 can direct most of beam 222 back to system plane 410. Reflector 435 can be a flat mirror or focusing element such as a parabolic mirror that directs beam 222 onto a diffractive element 440. Diffractive element 440 is a diffuser that is positioned and engineered to produce a collimated beam 442 having uniform intensity across an incident area on plane 410 sufficient to contain a photodiode 450. Photodiode 450 can then convert a portion of beam 442 into an electrical signal representing the data from transmitting circuit unit 412 and provide the electrical signal to circuit unit 414 in system plane 410. Use of optical beams 222 and 442 to relay data from transmitting circuit 412 to receiving unit 414 avoids impedance and noise issues that might arise if data were transmitted in system plane 440 a significant distance, e.g., several cm or more, using a high-frequency electrical signal. In this way, system 400 can "re-use" the transmitted beam to broadcast the data to other portions of system plane 410 or to another adjacent system plane. The amount of the "drops" will depend again on the receiver sensitivity and the losses of the system.

A reflector 455 is around photodiode 450, so that of beam 442 is incident on reflector 455. Reflector 455 may be flat or curved as needed to reflect a portion of beam 442 through a diffractive optical element 460. Diffractive element 460 then produces a beam 462 having a uniform intensity across a desired cross-section. The area of uniform intensity is of a size sufficient to tolerate relative misalignment of a second photodiode 470 on system plane 420. Photodiode 470 can then convert a portion of beam 462 into an electrical signal representing the data from transmitting circuit unit 412 and provide the electrical signal to circuit unit 426 in system plane 420.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A system comprising:
   a transmitter including:
      a beam source that produces a beam that represents information; and
      an optical element in a path of the beam, wherein the optical element alters the beam so that the beam has a uniform intensity over a cross-sectional area; and
   a receiver separated from the transmitter by free space through which the beam propagates and having an expected displacement path relative to the transmitter corresponding to vibrations in the system, the receiver including an active area positioned to receive a portion of the beam that the receiver converts into a received signal representing the information, wherein:
   the cross-sectional area of the beam is larger than the active area by an amount that accommodates a range of misalignment of the receiver with the transmitter; and
   the cross-sectional area is patterned so that the active area of the receiver receives light from the cross-sectional area of the beam when the receiver moves along the expected displacement path.

2. The system of claim 1, wherein the optical element comprises a diffractive element that transforms an initially non-uniform intensity distribution of the beam into the uniform intensity distribution.

3. The system of claim 1, wherein the optical element comprises refractive optics that transform an initially non-uniform intensity distribution of the beam into the uniform intensity distribution.

4. The system of claim 1, wherein the active area is a photosensitive area of a photodiode that converts the portion of the beam into an electrical signal representing the information.

5. The system of claim 4, wherein the receiver further comprises a lens that concentrates the portion of the beam onto the photosensitive area of the photodiode.

6. The system of claim 4, wherein the receiver further comprises grating that concentrates the portion of the beam on the photosensitive area of the photodiode.

7. The system of claim 1, wherein the cross-sectional area is at least twice as wide as the active area.

8. The system of claim 1, wherein:
   the transmitter is mounted in a first system plane that further comprises a first unit that produces a first electrical signal representing the information; and
   the receiver is mounted in a second system plane that further comprises a second unit coupled to use the received signal.

9. The system of claim 8, wherein each of the first and second system planes comprises a blade in a server system.

10. The system of claim 8, wherein the first system plane is substantially parallel to the second system plane, and the free space is between the first and second system planes.

11. A system comprising:
   a first system plane including:
   a first unit that produces a first electrical signal representing information; and
   a transmitter mounted in the first system plane and including:
      a beam source that produces a beam that represents the information; and
      an optical element in a path of the beam, wherein the optical element alters the beam so that the beam has a uniform intensity over a cross-sectional area and a second system plane including:
   a receiver mounted in the second system plane and separated from the transmitter by free space through which the beam propagates, the receiver including an active area positioned to receive a portion of the beam that the receiver converts into a received signal representing the information, wherein the cross-sectional area of the beam is larger than the active area by an amount that accommodates a range of misalignment of the receiver with the transmitter; and
   a first reflector adjacent to the active area of the receiver and positioned to direct a portion of the beam back through free space to the first system plane.

12. The system of claim 11, wherein the first system plane further comprises a second receiver and a third unit, the second receiver being positioned to receive the beam after reflection from the first reflector in the second plane and the third unit being coupled to use an electrical signal generated from the beam by the second receiver.

13. The system of claim 12, wherein the first system plane further comprises a second reflector adjacent to an active area of the second receiver and positioned to direct a portion of the beam back through free space to the second system plane.

14. A communication method comprising:
modulating a beam to represent information to be sent from a first system to a second system;
directing the beam through an optical system that alters the beam so that the beam has a uniform intensity over a cross-sectional area wider than an expected maximum misalignment of the first system and the second system; and
transmitting the beam through free space from the first system to the second system, wherein
the cross-sectional area of the uniform intensity is patterned so that an active area of a receiver in the second system is within the cross-sectional area when the receiver moves along an expected displacement path corresponding to vibrations of the receiver relative to a transmitter of the beam in the first system.

15. The method of claim 14, wherein each of the first and second systems comprises a blade in a server.

16. The method of claim 14, wherein the optical system comprises a diffractive element.

17. The method of claim 14, further comprises operating a photodiode in the second system to convert a portion of the beam into an electrical signal used in the second system, wherein the photodiode has a photosensitive area with a width less than one half of a width of the beam.

18. A communication method comprising:
modulating a beam to represent information to be sent from a first system to a second system;
directing the beam through an optical system that alters the beam so that the beam has a uniform intensity over a cross-sectional area wider than an expected maximum misalignment of the first system and the second system;
transmitting the beam through free space from the first system to the second system;
reflecting a portion of the beam back from the second system through the free space to the first system; and
converting a portion of the beam reflected back to the first system to produce an electrical signal representing the information.

19. A communication method comprising:
modulating a beam to represent information to be sent from a first system to a second system;
directing the beam through an optical system that alters the beam so that the beam has a uniform intensity over a cross-sectional area wider than an expected maximum misalignment of the first system and the second system;
transmitting the beam through free space from the first system to the second system;
converting a portion of the beam received at the second system to produce a first electrical signal representing the information;
using the first electrical signal in a first unit in the second system;
reflecting a portion of the beam back from the second system through the free space to the first system;
reflecting a portion of the beam back from the first system through the free space to the second system;
converting a portion of the beam reflected back to the second system to produce a second electrical signal representing the information; and
using the second electrical signal in a second unit in the second system.

20. A system comprising:
a back plane;
a first circuit board mounted on and electrically connected to the backplane, the first circuit board comprising:
a beam source that produces a beam that represents information; and
an optical element in a path of the beam, wherein the optical element alters the beam so that the beam has a uniform intensity over a cross-sectional area; and
a second circuit board mounted on and electrically connected to the backplane, the second circuit board being separated from the first circuit board by free space through which the beam propagates, the second circuit board comprising a receiver including an active area positioned to receive a portion of the beam that the receiver converts into a received signal representing the information, wherein:
the cross-sectional area of the beam is larger than the active area by an amount that accommodates a range of misalignment of mountings of the first and second circuit boards on the back plane; and
the receiver has an expected displacement path relative to the transmitter corresponding to vibrations in the system, and the cross-sectional area is patterned so that the active area of the receiver receives light from the cross-sectional area of the beam when the receiver moves along the expected displacement path.

21. The system of claim 20, wherein the system comprises a server system and the first and second circuit boards are portions of respective server blades of the server system.

22. A system comprising:
a back plane;
a first circuit board mounted on and electrically connected to the backplane, the first circuit board comprising:
a beam source that produces a beam that represents information; and
an optical element in a path of the beam, wherein the optical element alters the beam so that the beam has a uniform intensity over a cross-sectional area;
a second circuit board mounted on and electrically connected to the backplane, the second circuit board being separated from the first circuit board by free space through which the beam propagates, the second circuit board comprising a receiver including an active area positioned to receive a portion of the beam that the receiver converts into a received signal representing the information, wherein the cross-sectional area of the beam is larger than the active area by an amount that accommodates a range of misalignment of mountings of the first and second circuit boards on the back plane; and
a first reflector positioned to direct a portion of the beam back through free space to the first circuit board.

23. The system of claim 22, wherein the first circuit board further comprises a second receiver, the second receiver being positioned to receive the beam after reflection from the first reflector on the second circuit board including a circuit unit that is coupled to use an electrical signal generated from the beam by the second receiver.

24. The system of claim 22, wherein the first circuit board further comprises a second reflector positioned to direct a portion of the beam back through free space to the second circuit board.

* * * * *

UNITED STATES PATENT AND TRADEMARK OFFICE
CERTIFICATE OF CORRECTION

PATENT NO. : 8,315,526 B2
APPLICATION NO. : 11/820299
DATED : November 20, 2012
INVENTOR(S) : Michael R. T. Tan et al.

Page 1 of 1

It is certified that error appears in the above-identified patent and that said Letters Patent is hereby corrected as shown below:

In the Claims:

In column 6, line 54, in Claim 11, delete "area" and insert -- area; --, therefor.

Signed and Sealed this
Fourteenth Day of May, 2013

Teresa Stanek Rea
*Acting Director of the United States Patent and Trademark Office*